US012769379B2

(12) United States Patent
Chen et al.

(10) Patent No.: US 12,769,379 B2
(45) Date of Patent: Oct. 20, 2026

(54) METHOD FOR RESETTING PROCESSOR AND COMPUTER DEVICE

(71) Applicant: ASPEED Technology Inc., Hsinchu City (TW)

(72) Inventors: Shih-Fang Chen, Hsinchu City (TW); Chin-Ting Kuo, Hsinchu City (TW); Chia-Wei Wang, Hsinchu City (TW); Chih-Chiang Mao, Hsinchu City (TW)

(73) Assignee: ASPEED Technology Inc., Hsinchu City (TW)

( * ) Notice: Subject to any disclaimer, the term of this patent is extended or adjusted under 35 U.S.C. 154(b) by 132 days.

(21) Appl. No.: 18/481,990

(22) Filed: Oct. 5, 2023

(65) Prior Publication Data

US 2024/0345640 A1 Oct. 17, 2024

(30) Foreign Application Priority Data

Apr. 14, 2023 (TW) ................................ 112114031

(51) Int. Cl.
*G06F 1/24* (2006.01)

(52) U.S. Cl.
CPC .................................... *G06F 1/24* (2013.01)

(58) Field of Classification Search
CPC ........................................................ G06F 1/24
See application file for complete search history.

(56) References Cited

U.S. PATENT DOCUMENTS 8,239,959 B2 * 8/2012 Gellerich ................ G06F 21/78 726/34
9,367,692 B2 * 6/2016 Brown .................. G06F 9/4403
2004/0255111 A1 * 12/2004 Lim ...................... G06F 15/177 713/2
2005/0060541 A1 * 3/2005 Angelo .................. G06F 21/64 726/4
2007/0294745 A1 * 12/2007 Tan ......................... G06F 21/74 348/E5.004

(Continued)

FOREIGN PATENT DOCUMENTS

| | | |
|---|---|---|
| EP | 3092560 | 5/2019 |
| TW | 202127283 | 7/2021 |

OTHER PUBLICATIONS

"Office Action of Taiwan Counterpart Application", issued on Dec. 12, 2023, p. 1-p. 10.

*Primary Examiner* — Jaweed A Abbaszadeh
*Assistant Examiner* — Ayman Fatima
(74) *Attorney, Agent, or Firm* — JCIPRNET

(57) ABSTRACT

Embodiments of the disclosure provide a method for resetting a processor and a computer device. The method includes: obtaining an image file corresponding to a coprocessor by a first component of the computer device, and loading the image file into a reference space in a RAM by the first component; loading the image file stored in the reference space into a specific space corresponding to the coprocessor by a second component of the computer device and validating the image file stored in the specific space by the second component in response to determining that the coprocessor needs to be reset; and resetting the coprocessor by the second component based on the image file stored in the specific space in response to the second component determining that the image file stored in the specific space is valid.

6 Claims, 16 Drawing Sheets

(56) References Cited

U.S. PATENT DOCUMENTS

| | | | | |
|---|---|---|---|---|
| 2012/0005464 | A1* | 1/2012 | Tanaka | G06F 9/4401<br>713/1 |
| 2015/0095701 | A1* | 4/2015 | Hodgson | G06F 16/162<br>714/23 |
| 2018/0322013 | A1* | 11/2018 | Yang | G06F 11/1417 |
| 2020/0110880 | A1* | 4/2020 | Ghetie | G06F 21/575 |
| 2020/0272739 | A1* | 8/2020 | Shivanna | H04L 9/3234 |

* cited by examiner

METHOD FOR RESETTING PROCESSOR AND COMPUTER DEVICE

CROSS-REFERENCE TO RELATED APPLICATION

This application claims the priority benefit of Taiwan application serial no. 112114031, filed on Apr. 14, 2023. The entirety of the above-mentioned patent application is hereby incorporated by reference herein and made a part of this specification.

BACKGROUND OF THE INVENTION

Field of the Invention

The invention relates to a technique for controlling a processor, and in particular relates to a method for resetting a processor and a computer device.

Description of Related Art

FIG. 1 is an architecture diagram of a computer device shown according to an embodiment of the invention. In FIG. 1, a computer device 100 may include a controller 105, a system-on-chip (SoC) 110 (such as a baseboard management controller (BMC)), a processing unit 120, a random-access memory (RAM) 130, a static memory 140, and a peripheral device 150.

The SoC 110 may include a memory 111, a main processor 112, and a coprocessor 113. In some embodiments, the controller 105 may be implemented as a microcontroller unit (MCU), a complex programmable logic device (CPLD), or an MCU disposed in the SoC 110, but may be not limited thereto.

The memory 111 is, for example, a hardware read-only memory (HW ROM) that may record module/code/firmware executable by the controller 105. In some embodiments, the controller 105 and the memory 111 may be implemented based on Opentitan or Caliptra framework, but not limited thereto.

In a different embodiment, the main processor 112 and the coprocessor 113 may be implemented using different components. For example, assuming that the selected processor architecture is ARM architecture, the main processor 112 may be implemented as a CA35 processor, and the coprocessor 113 may be implemented as a CM4 processor, but may be not limited thereto.

The CA35 processor may be used to execute the most complex calculations in the system, and may support security functions by operating in secure mode or non-secure mode (non-secure mode is also known as normal mode). In some embodiments, the SoC 110 may further include other coprocessors (such as an I/O MCU), but is not limited thereto.

In different application requirements, the use of the CM4 processor may depend on the user's needs, and the security permission of the CM4 processor may be higher or lower than the security permission of the CA35 processor (this needs to be configured in advance and may not be changed after the computer device 100 is booted).

If the security permission of the CM4 processor is lower than the security mode of the CA35 processor, the CM4 processor may be configured for CA35 security mode access only. If the security permission of the CM4 processor is configured higher than the CA35 processor, the CA35 processor may not access or control the CM4 processor in both non-secure mode and secure mode. In addition, the I/O MCU may be designed to offload an I/O task of the CA35 processor or the CM4 processor according to requirements, but may be not limited thereto.

In some embodiments, the RAM 130 may be implemented as a dynamic RAM (DRAM) or the like. The static memory 140 may be implemented as a NOR flash memory or a NAND flash memory, but may be not limited thereto.

The processing unit 120 is, for example, a central processing unit (CPU) implemented based on the X86 concept, and may access the peripheral device 150 (such as an I3C device, an I2C device, etc.) via the coprocessor 113. That is, the coprocessor 113 may be used as a bridge between the processing unit 120 and the peripheral device 150.

In the existing secure boot or platform security specification, it is mostly stated that if any processor (such as the main processor 112 and/or the coprocessor 113) on the SoC 110 needs to be reset, then all the processors on the SoC 110 should be reset at the same time, and the corresponding image file needs to be reloaded and validated before each processor operates. However, this approach lacks flexibility for some applications.

For example, in the architecture of FIG. 1, since the coprocessor 113 is used as a bridge between the processing unit 120 and the peripheral device 150, the coprocessor 113 needs to be able to operate independently, otherwise, when all the processors on the SoC 110 are reset simultaneously, the processing unit 120 is unable to access the peripheral device 150, and then some tasks performed by the processing unit 120 are suspended.

However, even though the CM4 processor has the ability to operate independently (e.g., reset independently), several issues still exist in the prior art.

For example, after the CA35 processor is powered on, it will periodically or irregularly access the static memory 140 to perform a read or write operation. Generally, the static memory 140 is only allowed to be accessed by one processor at a time. In addition, the static memory 140 may be busy for a period of time after receiving a write request, and other access requests are ignored during this period. In other words, when CA35 is accessing the static memory 140, since the controller 105 (of the memory 111) may not successfully read the correct image file of the CM4 processor from the static memory 140 during the process of resetting the CM4 processor, the CM4 processor may not be successfully reset.

SUMMARY OF THE INVENTION

Accordingly, the invention provides a method for resetting a processor and a computer device that may be used to solve the above technical issues.

An embodiment of the invention provides a method for resetting a processor, suitable for a computer device including a controller, a main processor, a coprocessor, and a random-access memory, the method including: obtaining an image file corresponding to the coprocessor by a first component of the computer device, and loading the image file into a reference space in the random-access memory by the first component, wherein the random-access memory includes a specific space corresponding to the coprocessor, the first component is one of the main processor and the controller, and the coprocessor may also be the first component when an update image is obtained; enabling a reset signal of the coprocessor and loading the image file stored in the reference space into the specific space corresponding to the coprocessor by a second component of the computer device and validating the image file stored in the specific space by the second component in response to determining whether the reset signal of the coprocessor may be released, wherein the second component is one of the controller and the main processor; and releasing the reset signal of the coprocessor based on the image file stored in the specific space by the second component in response to the second component determining that the image file stored in the specific space is valid.

An embodiment of the invention provides a computer device including a controller, a main processor, a coprocessor, and a random-access memory. A first component of the computer device obtains an image file corresponding to the coprocessor, and the first component loads the image file into a reference space in the random-access memory, wherein the random-access memory includes a specific space corresponding to the coprocessor, and the first component is one of the main processor, the coprocessor, and the controller. A second component of the computer device holds a reset signal of the coprocessor and loads the image file stored in the reference space into the specific space corresponding to the coprocessor and the second component validates the image file stored in the specific space in response to determining whether the reset signal of the coprocessor may be released, wherein the second component is one of the controller and the main processor. The second component releases the reset signal of the coprocessor based on the image file stored in the specific space in response to the second component determining that the image file stored in the specific space is valid.

BRIEF DESCRIPTION OF THE DRAWINGS

FIG. 7A.

DESCRIPTION OF THE EMBODIMENTS

Figure 1:
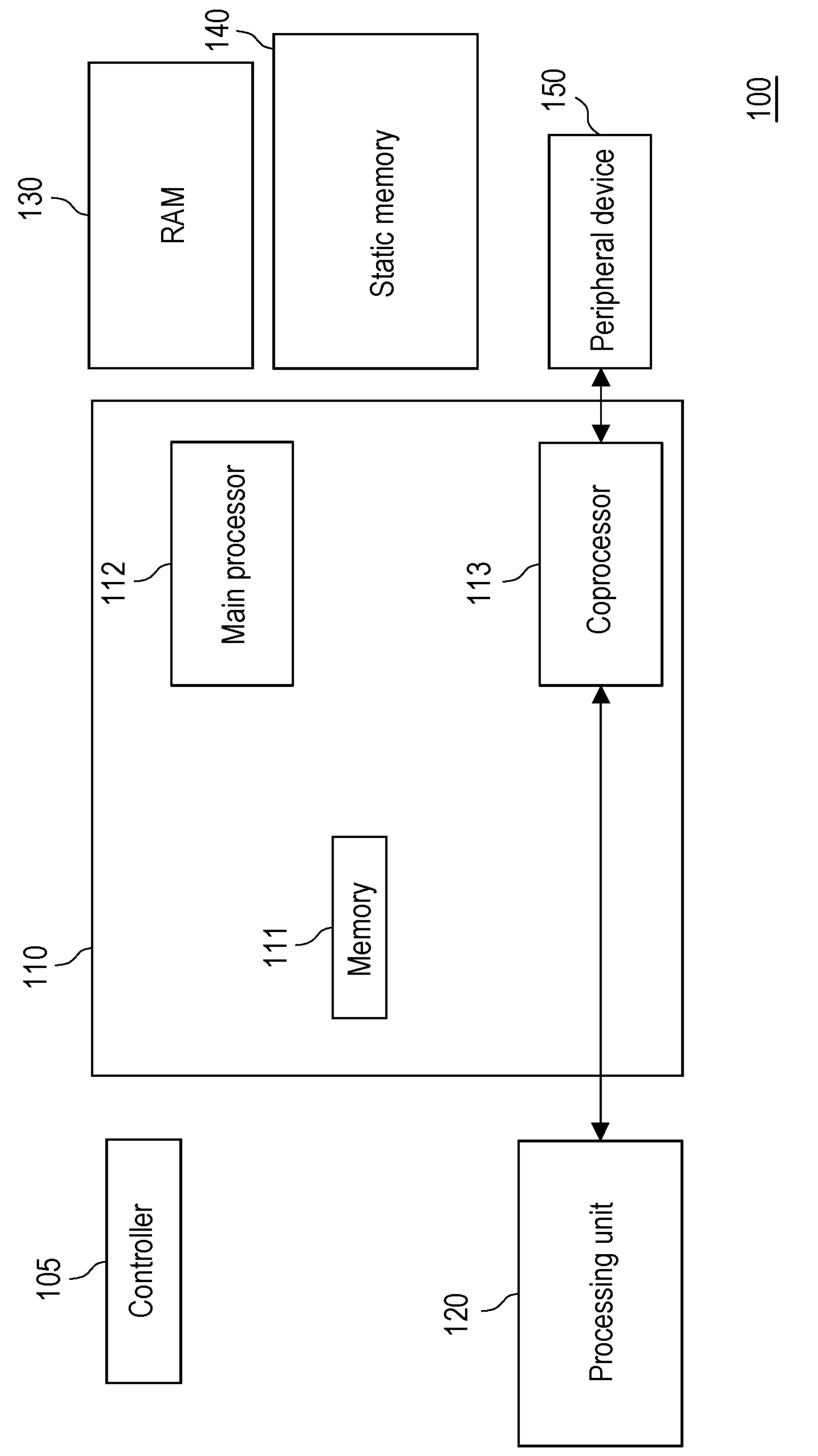
FIG. 1 is an architecture diagram of a computer device shown according to an embodiment of the invention.
Figure 2:
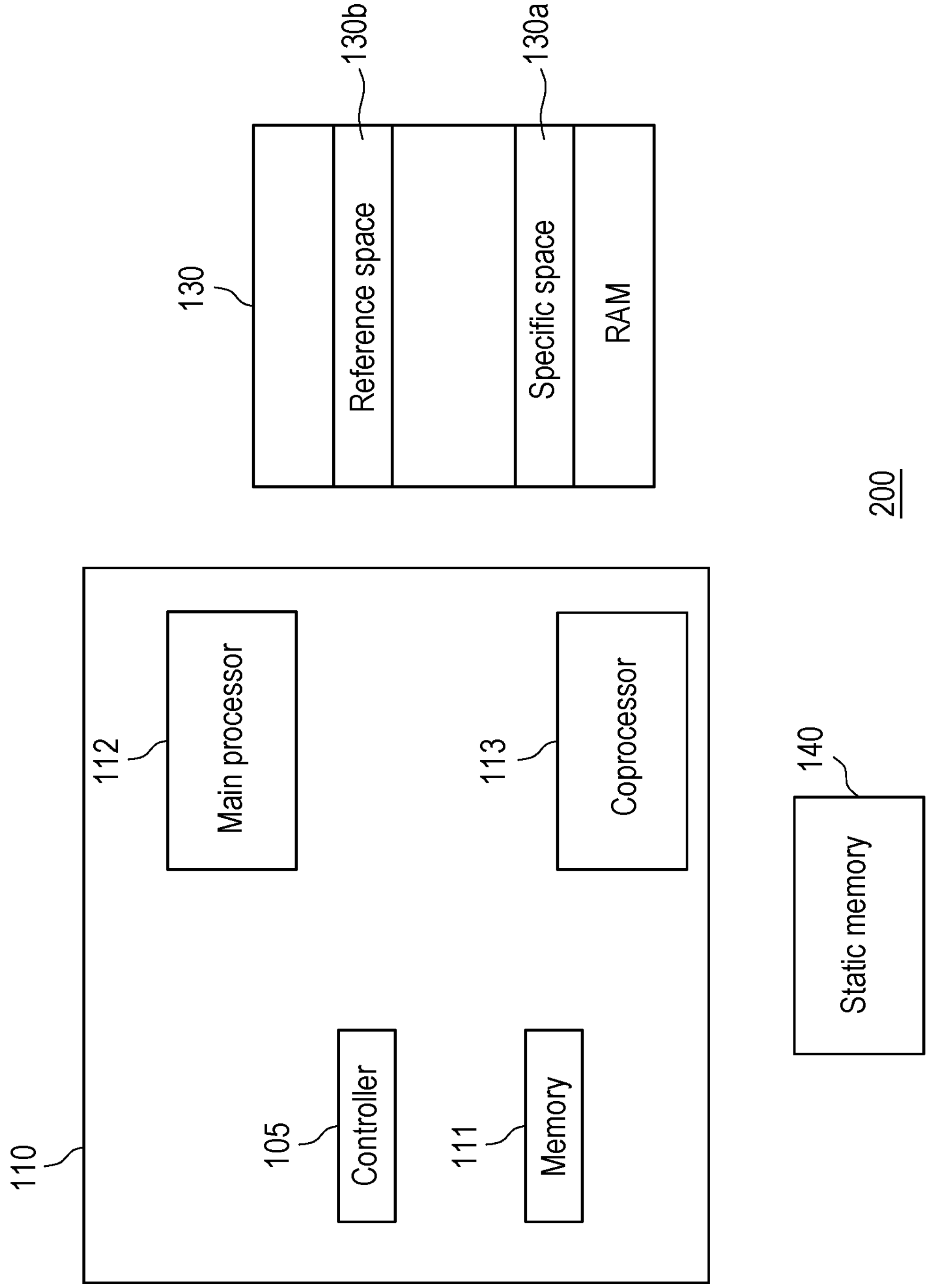
FIG. 2 is a schematic diagram of a computer device shown according to FIG. 1.

FIG. 2 is a schematic diagram of a computer device shown according to FIG. 1. In a computer device 200 of FIG. 2, it is assumed that the controller 105 is an MCU disposed in the SoC 110 and may perform a desired operation based on the module/program code/firmware in the memory 111 (e.g., hardware ROM). In addition, when the SoC 110 is powered on or the system is rebooted, compared with the main processor 112 and the coprocessor 113, the controller 105 is the first component for which the reset signal is released.

For the convenience of description, it is assumed that the main processor 112 and the coprocessor 113 in the computer device 200 are implemented by the ARM architecture. Accordingly, the main processor 112 is, for example, a CA35 processor, and the coprocessor 113 is, for example, a CM4 processor, but may be not limited thereto. For ease of description, in the present specification, both single processor reboot and whole system reboot are included under the concept of processor/system reset.

In addition, in an embodiment of the invention, the random-access memory 130 includes a specific space 130*a* and a reference space 130*b*, wherein the specific space 130*a* is, for example, a dedicated space/storage area for storing various image files (such as an updated image file or an image file for reset) corresponding to the coprocessor 113.

That is, when the coprocessor 113 needs to reset or update an executable image, the coprocessor 113 only executes an executable file (such as an image file) stored in the specific space 130*a* after the reset signal is released, and files stored in other areas/spaces in the random-access memory 130 are not executed. In other words, the specific space 130*a* is the executable space of the coprocessor 113.

In an embodiment of the invention, the random-access memory 130 also includes a reference space 130*b*, which is, for example, a backup space/storage area that may be used to store various image files (such as an update image file or an image file for reset) corresponding to the coprocessor 113. However, in an embodiment of the invention, the coprocessor 113 does not perform reset or executable image update directly based on the content stored in the reference space 130*b*.

In general, the method of an embodiment of the invention may regard the reference space 130*b* as another type of static memory for use, and when the coprocessor 113 needs to perform a reset operation or an update operation on the executable image based on the file stored in the specific space 130*a*, the file stored in the reference space 130*b* may be loaded into the specific space 130*a* for the coprocessor 113 to perform the reset operation or the update operation on the executable image. In this way, no matter whether the static memory 140 is occupied (for example, being accessed by the main processor 112), the coprocessor 113 may complete the reset operation or the update operation of the executable image. Description is further provided below.

Figure 3:
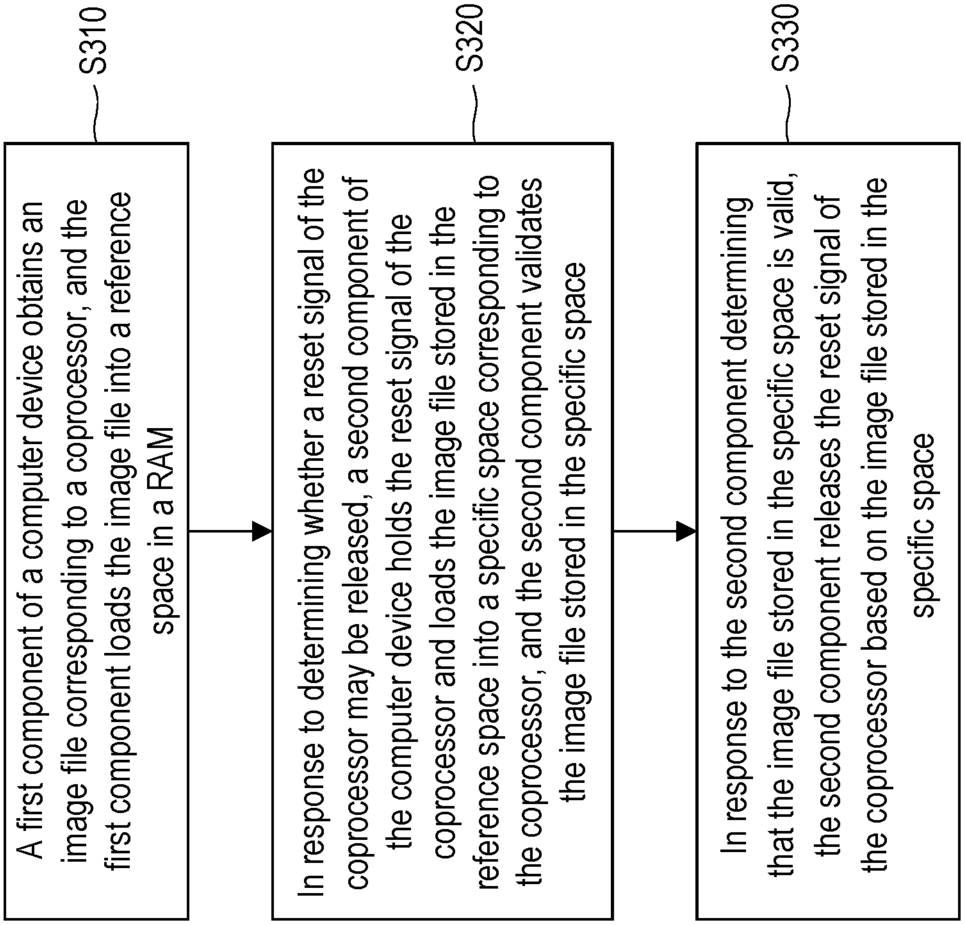
FIG. 3 is a flowchart of a method for resetting a processor shown according to an embodiment of the invention.

FIG. 3 is a flowchart of a method for resetting a processor shown according to an embodiment of the invention. The method of the present embodiment may be performed by the computer device 200 of FIG. 2, and the details of each step of FIG. 3 are described below with the components shown in FIG. 2.

First, in step S310, the first component of the computer device 200 obtains the image file (hereinafter referred to as IM) corresponding to the coprocessor 113, and the first component loads the image file IM into the reference space 130*b* in the random-access memory 130, wherein the first component is one of the main processor 112 and the coprocessor 113.

In an embodiment of the invention, the image file IM is, for example, an update image file for updating the coprocessor 113 or an image file for resetting the coprocessor 113, and may be stored in the reference space 130*b* after being obtained by the first component (such as the main processor 112 or the coprocessor 113) from the Internet and/or various sources.

In step S320, in response to determining that the coprocessor 113 needs to be reset, the second component of the computer device 200 holds the reset signal of the coprocessor and loads the image file IM stored in the reference space 130*b* into the specific space 130*a* corresponding to the coprocessor 113, and the second component validates the image file IM stored in the specific space 130*a*, wherein the second component is one of the controller 105 and the main processor 112.

In a different embodiment, the second component (such as the controller 105 or the main processor 112) may validate the image file IM stored in the specific space 130*a* based on the method needed by the designer. For example, the second component may validate the data integrity of the image file IM stored in the specific space 130*a*, and when it is determined that the data integrity of the image file IM stored in the specific space 130*a* is valid, may determine that the image file IM stored in the specific space 130*a* is valid, otherwise, may determine that the image file IM stored in the specific space 130*a* is invalid, but may be not limited thereto.

In an embodiment, the image file IM stored in the specific space 130*a* may have two parts: an image file content and a signature, and the second component may decrypt the signature into a first hash value based on a public key, and calculate a second hash value corresponding to the image file content. If the first hash value matches the second hash value, the second component may determine that the image file IM is valid, otherwise, may determine that the image file IM is invalid, but may be not limited thereto.

In step S330, the second component resets the coprocessor 13 based on the image file IM stored in the specific space 130*a* in response to the second component determining that the image file IM stored in the specific space is valid.

In an embodiment, the second component may release the reset signal corresponding to the coprocessor 113 to trigger the coprocessor 113 to perform a reset operation based on the image file IM stored in the specific space 130*a*, but may be not limited thereto.

Generally, the embodiments of the invention may be divided into the first embodiment and the second embodiment. The security permission of the main processor 112 in the first embodiment is higher than the security permission of the coprocessor 113, and the security permission of the main processor 112 in the second embodiment is lower than the security permission of the coprocessor 113. It should be understood that the security permission of the controller 105 in the present application is higher than the security permission of the main processor 112 and the coprocessor 113.

Accordingly, the concept of the present application is further described below with figures corresponding to different scenarios, wherein FIG. 4A to FIG. 7B correspond to the first embodiment, and FIG. 8A to FIG. 8B correspond to the second embodiment.

Figure 4A:
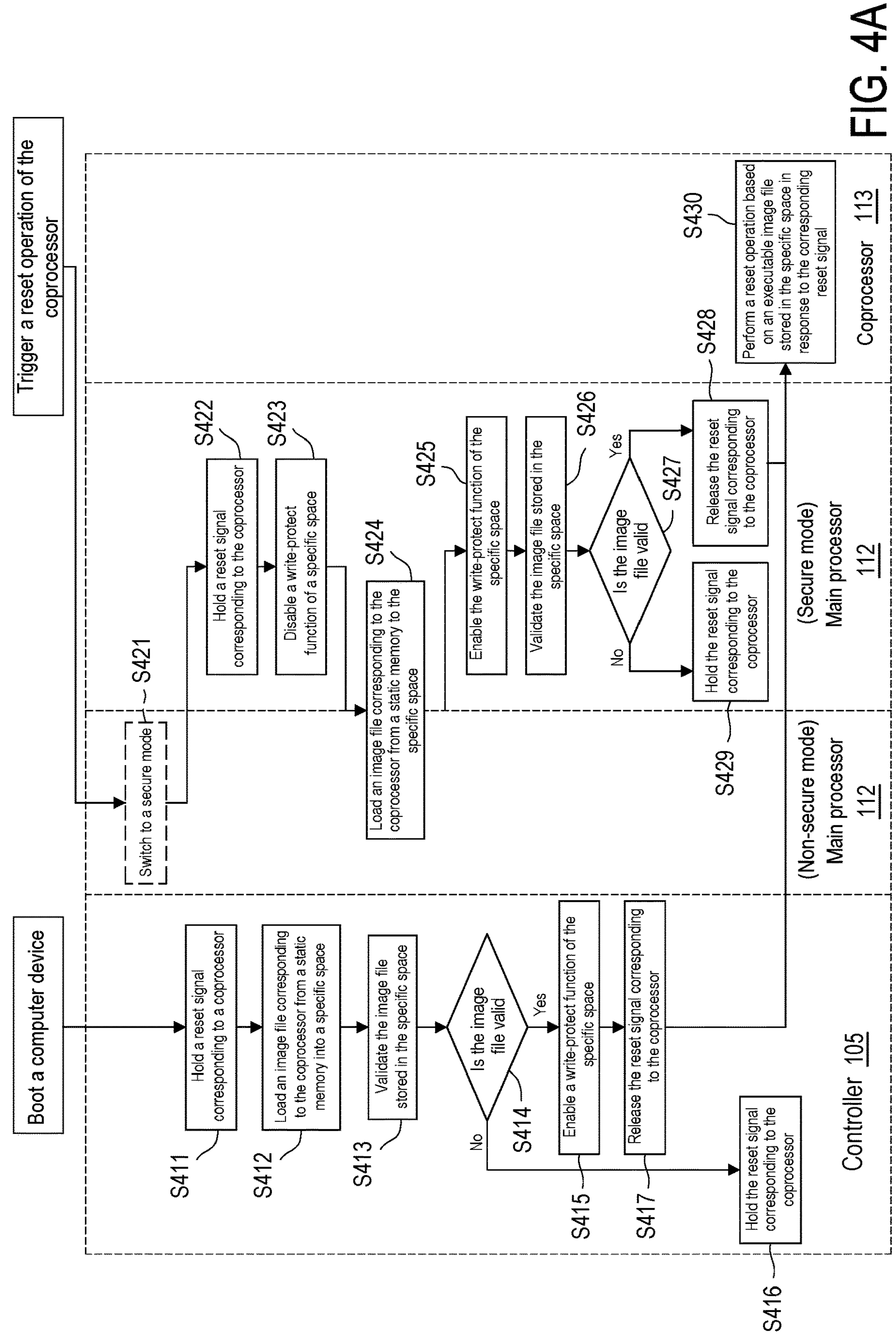
FIG. 4A is a flowchart of resetting a coprocessor shown according to a first scenario of the first embodiment of the invention.
Figure 4B:
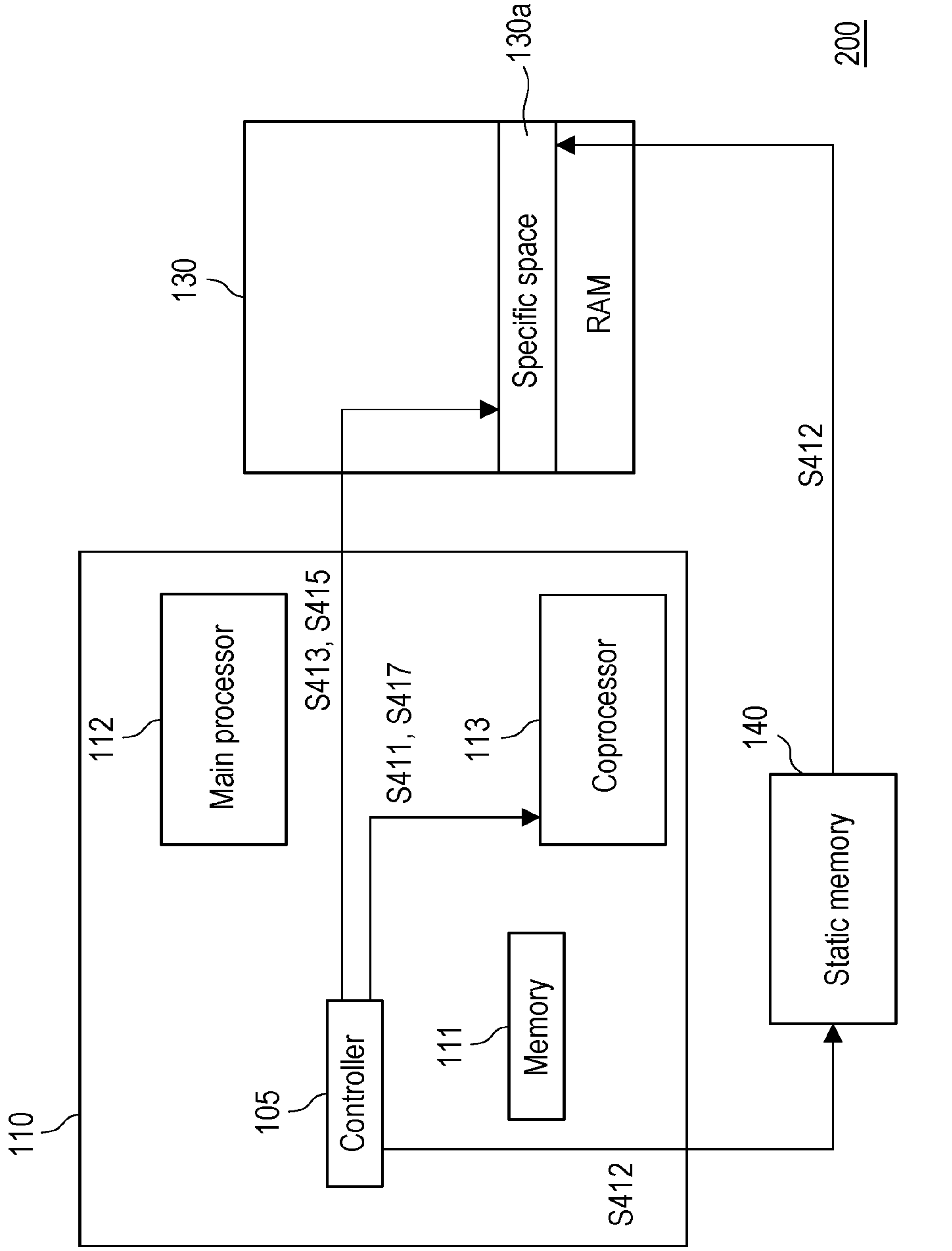
FIG. 4B and FIG. 4C are schematic diagrams of operations shown according to FIG. 2 and FIG. 4A.
Figure 4C:
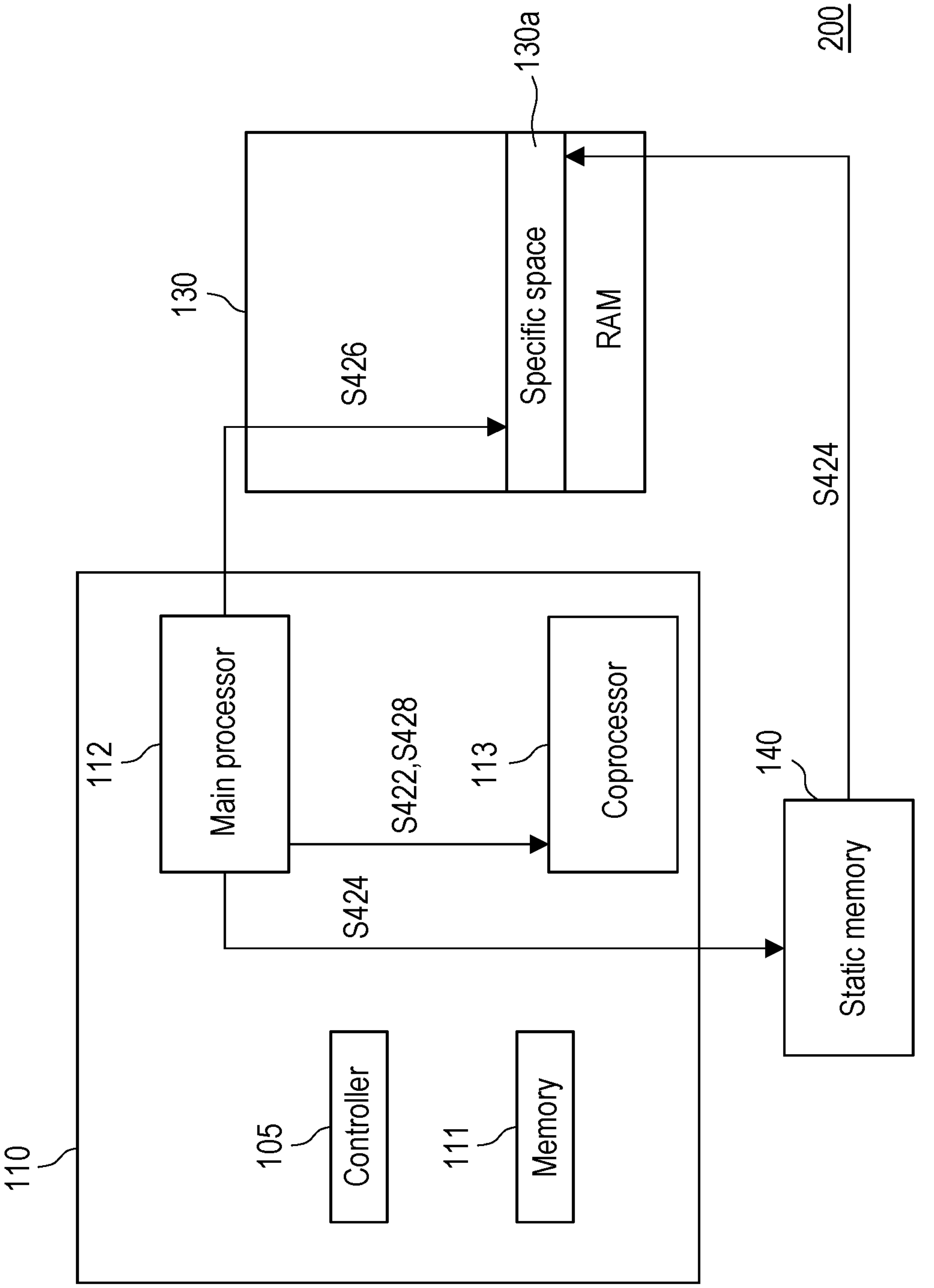

Please refer to FIG. 4A to FIG. 4C, wherein FIG. 4A is a flowchart of resetting a coprocessor shown in a first scenario according to the first embodiment of the invention, and FIG. 4B and FIG. 4C are schematic diagrams of operations shown according to FIG. 2 and FIG. 4A.

First of all, in FIG. 4A (and other figures in the present application), the operation performed by each component is arranged in a corresponding dotted box for easy reference. For example, steps S411 to S417 performed by the controller 105 in FIG. 4A are shown in the dotted box corresponding to the controller 105; step S421 (and step S424) performed by the main processor 112 in the non-secure mode is shown in the dotted box corresponding to the main processor 112 in the non-secure mode; steps S422 to S428 performed by the main processor 112 in the secure mode are shown in the dotted box corresponding to the main processor 112 in the secure mode; and step S430 performed by the coprocessor 113 is shown in the dotted box corresponding to the coprocessor 113.

In FIG. 4A and FIG. 4B, when the computer device 200 is turned on, in step S411, the controller 105 holds the reset signal corresponding to the coprocessor 113 so that the coprocessor 113 does not perform the reset operation temporarily. It should be noted that when the reset signal corresponding to the coprocessor 113 is held, it means that the coprocessor 113 may not perform any operation, including the reset operation. The coprocessor 113 may perform an operation only after the subsequent reset signal corresponding to the coprocessor 113 is released. In step S412, the controller 105 loads the image file IM corresponding to the coprocessor 113 from the static memory 140 into the specific space 130*a*. In step S413, the controller 105 may validate the image file IM stored in the specific space 130*a* according to the previously taught method, and determine whether the image file IM stored in the specific space 130*a* is valid in step S414.

If the image file IM stored in the specific space 130*a* is valid, it means that the image file IM stored in the specific space 130*a* has valid data integrity. Therefore, the controller 105 may continue to perform step S415 to enable the write-protect function of the specific space 130*a*, and release the reset signal corresponding to the coprocessor 113 in step S417, so that the coprocessor 113 may perform a reset operation.

Correspondingly, the coprocessor 113 may perform step S330 of FIG. 3. The coprocessor 113 performs a reset operation based on the image file IM stored in the specific space 130*a* in response to the corresponding reset signal.

Moreover, if the image file IM stored in the specific space 130*a* is invalid, it means that the image file IM stored in the specific space 130*a* does not have valid data integrity. Therefore, the controller 105 may continue to perform step S416 to hold the reset signal corresponding to the coprocessor 113. Accordingly, the coprocessor 113 does not perform the reset operation and/or other operations based on the image file IM stored in the specific space 130*a*, but may be not limited thereto.

Moreover, in FIG. 4A and FIG. 4C, when the reset operation of the coprocessor 113 is triggered, the main processor 112 in the non-secure mode (for example, the CA35 processor under the ARM architecture) may first switch to the secure mode in step S421. It should be understood that, in an embodiment in which the main processor 112 is assumed to operate under the ARM CPU architecture, the main processor 112 needs to switch from the non-secure mode to the secure mode via step S421 before proceeding to step S422. However, in an embodiment where the main processor 112 operates on other processor architectures, step S421 may not need to be performed, but may be not limited thereto. Therefore, step S421 is represented by a dotted line.

Next, the main processor 112 in the secure mode may hold the reset signal corresponding to the coprocessor 113 in step S422, disable the write-protect function of the specific space 130*a* in step S423, and load the image file IM corresponding to the coprocessor 113 from the static memory 140 into the specific space 130*a* in step S424.

In other embodiments, since the write-protect function of the specific space 130*a* is not necessarily in the enabled state, the considered second component (such as the main processor 112 or the controller 105) may correspondingly skip the related step of disabling the write-protect function of the specific space 130*a* (including the corresponding steps in the subsequent figures), but may be not limited thereto.

In some embodiments, before any of steps S423 to S426 is performed, the main processor 112 may also first determine whether the image file IM stored in the specific space 130*a* is reorganized (for example, whether the content thereof is adjusted/edited). If yes, the main processor 112 may continue to perform steps S423 to S426; if not, the main processor 112 may directly perform subsequent operations without performing steps S423 to S425, but may be not limited thereto.

In FIG. 4A, since step S424 may be performed by the main processor 112 in the secure mode or the non-secure mode, step S424 is shown as straddling the two dotted boxes shown, and steps with similar concepts in other figures are also shown in this way.

Next, the processor 112 in the secure mode may enable the write-protect function of the specific space 130*a* in step S425, and validate the image file IM stored in the specific space 130*a* in step S426, and in step S427, determine whether the image file IM stored in the specific space 130*a* is valid. If yes, the processor 112 in the secure mode may continue to perform step S428 to release the reset signal corresponding to the coprocessor 113, and in S430, the coprocessor 113 may perform a reset operation based on the executable image file IM stored in the specific space 130*a* in response to the corresponding reset signal. If not, the processor 112 in the secure mode may continue to perform step S429 to hold the reset signal corresponding to the coprocessor 113 (or it may be understood as suspending the reset process of the coprocessor 113). For the concepts of steps S422 to S429, reference may be made to the relevant descriptions of steps S411 to S417, which are not repeated here.

Figure 5A:
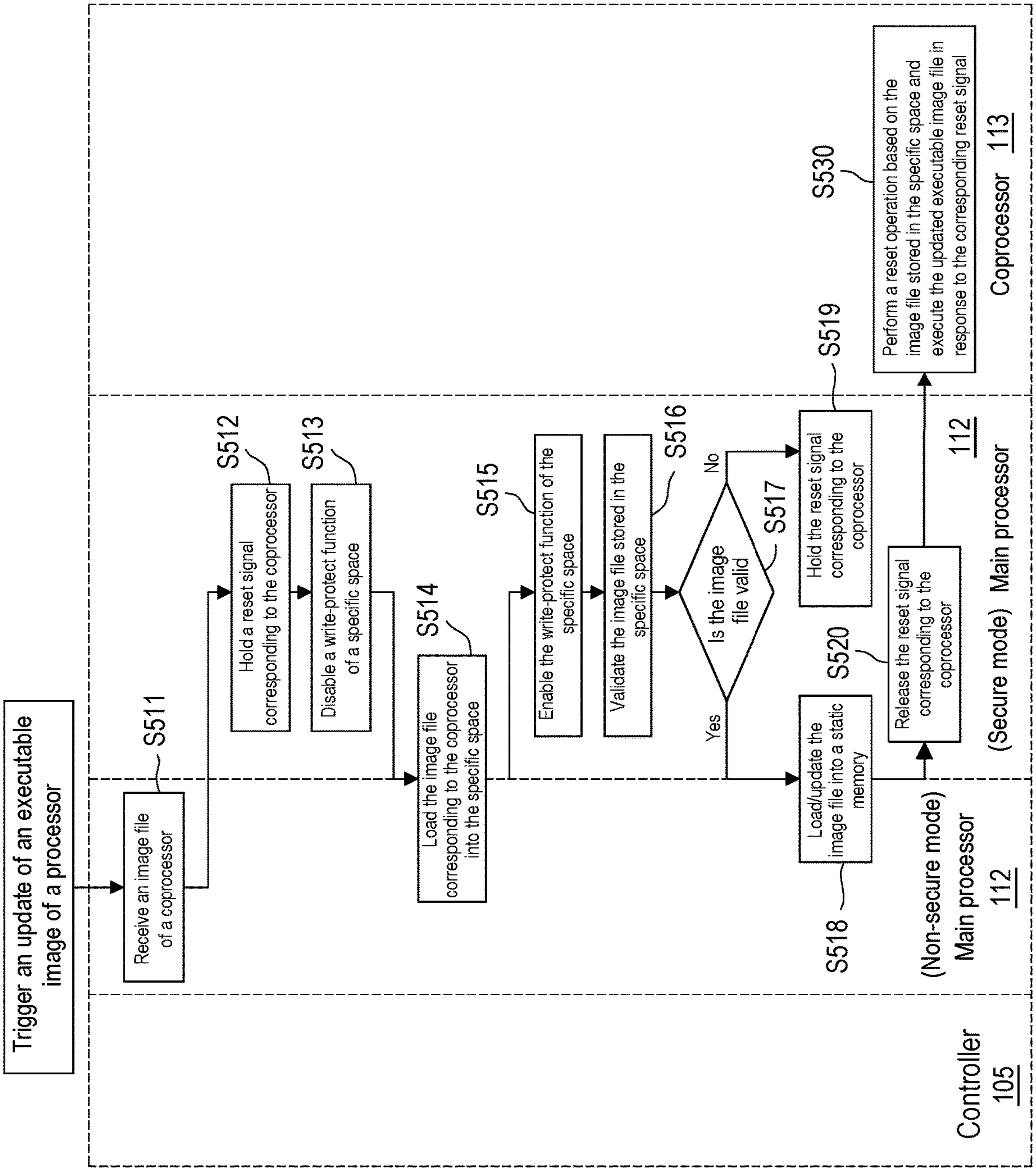
FIG. 5A is a flowchart of resetting a coprocessor shown according to a second scenario of the first embodiment of the invention.
Figure 5B:
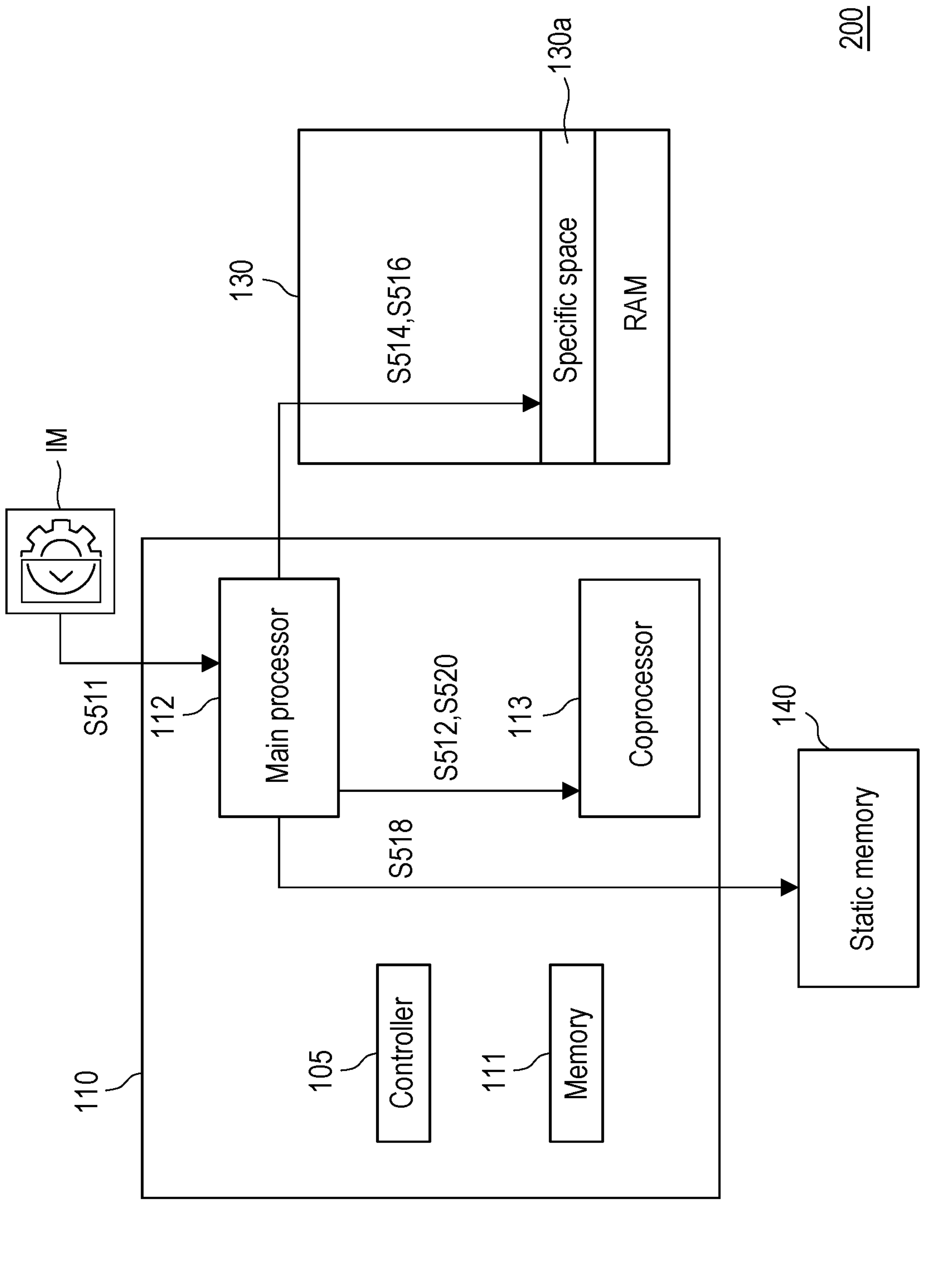
FIG. 5B is a schematic diagram of an operation shown according to FIG. 2 and FIG. 5A.

Please refer to FIG. 5A and FIG. 5B, wherein FIG. 5A is a flowchart of resetting a coprocessor shown in a second scenario according to the first embodiment of the invention, and FIG. 5B is a schematic diagram of operations shown according to FIG. 2 and FIG. 5A.

In FIG. 5A and FIG. 5B, when the executable image update of the coprocessor 113 is triggered, the main processor 112 in the non-secure mode (for example, the CA35 processor under the ARM architecture) may first receive the image file IM (for example, the update image file) of the coprocessor 113 in step S511. In the second scenario of the first embodiment (the security permission of the main processor 112 is higher than the security permission of the coprocessor 113), the considered first component is, for example, the main processor 112, and may obtain the image file IM in step S310, and load the image file IM into the reference space 130*b*.

Next, the processor 112 in the secure mode may hold the reset signal corresponding to the coprocessor 113 in step S512, disable the write-protect function of the specific space 130*a* in step S513, and load the image file IM corresponding to the coprocessor 113 into the specific space 130*a* in step S514.

In FIG. 5A, since step S514 may be performed by the main processor 112 in the secure mode or the non-secure mode, step S514 is shown as straddling the two dotted boxes shown, and steps with similar concepts in other figures are also shown in this way.

Next, the processor 112 in the secure mode may enable the write-protect function of the specific space 130*a* in step S515, and validate the image file IM stored in the specific space 130*a* in step S516, and in step S517, determine whether the image file IM stored in the specific space 130*a* is valid. If yes, the processor 112 in the secure mode may continue to perform step S518 to load/update the image file IM into the static memory 140, and release the reset signal corresponding to the coprocessor 113 in step S520. Correspondingly, the coprocessor 113 may perform a reset operation based on the image file IM stored in the specific space 130*a* in response to the corresponding reset signal in step S530 and execute the updated executable image file IM.

Moreover, if the image file IM stored in the specific space 130*a* is invalid, the processor 112 in the secure mode may continue to perform step S519 to hold the reset signal corresponding to the coprocessor 113 (or it may be understood as suspending the update of the coprocessor 113). The concept of steps S512 to S519 is as provided in the relevant description of the corresponding steps in FIG. 4A, and is not repeated here.

Figure 6A:
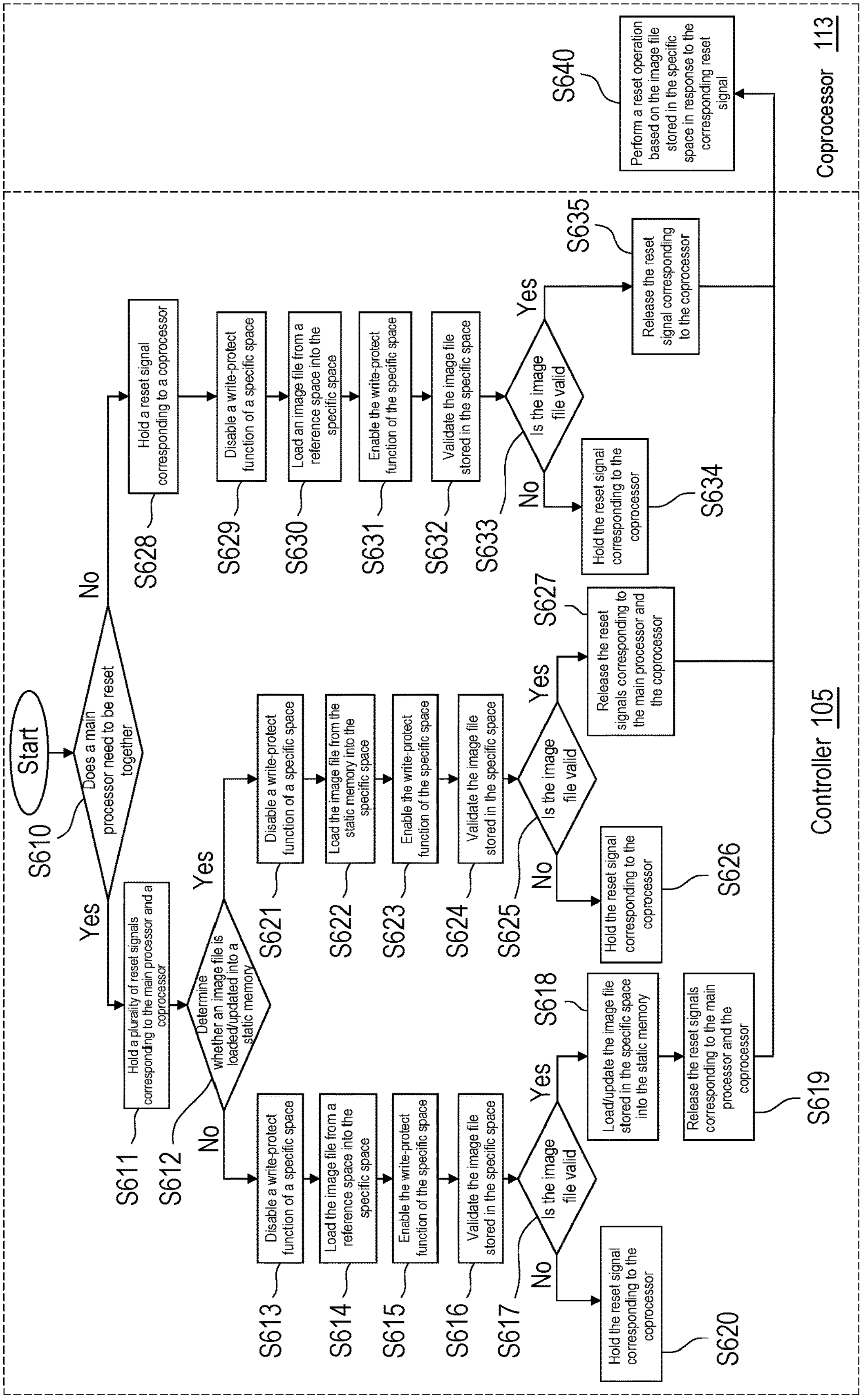
FIG. 6A is a flowchart of resetting a coprocessor shown according to a third scenario of the first embodiment of the invention.
Figure 6B:
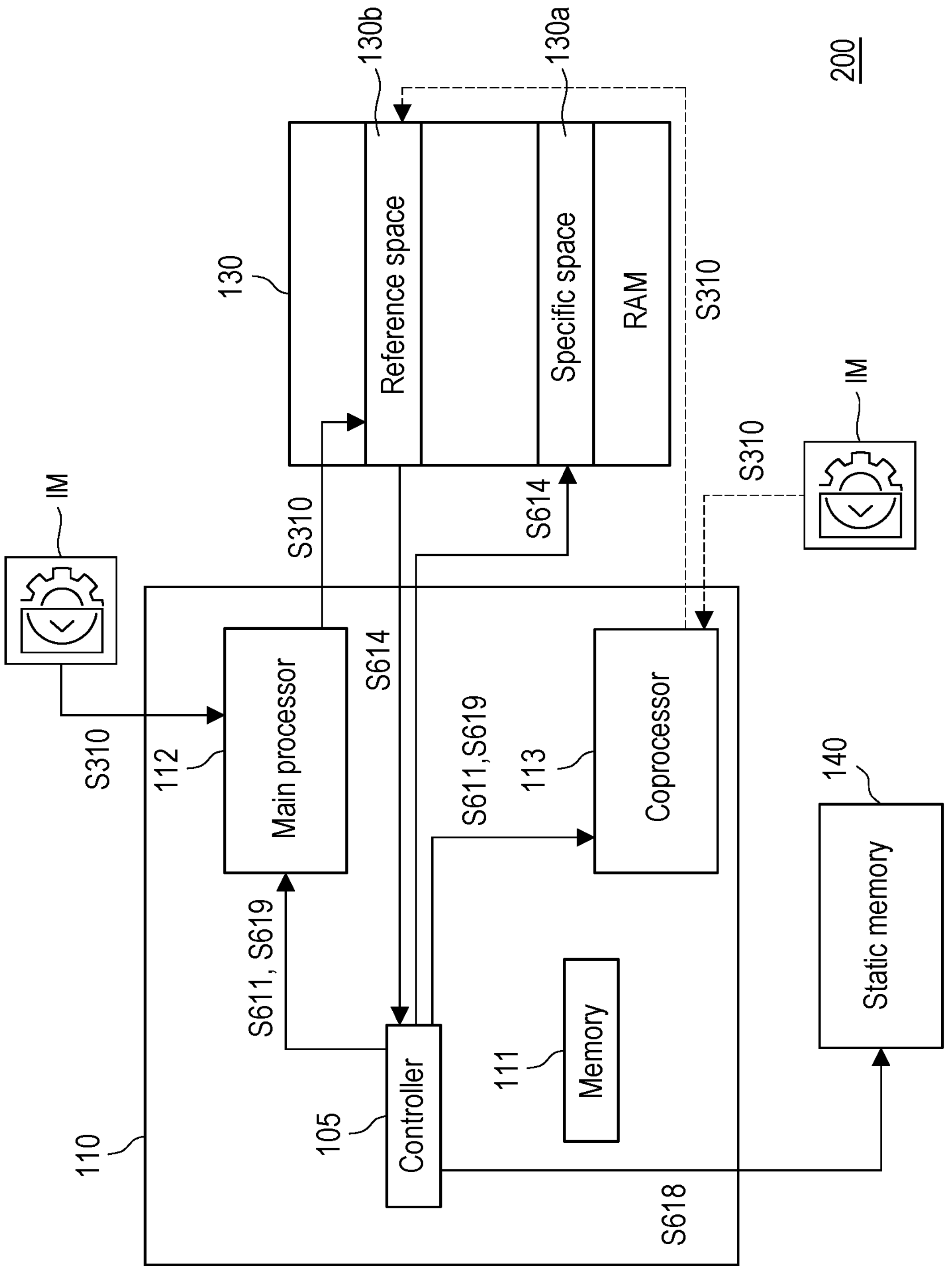
FIG. 6B and FIG. 6C are schematic diagrams of operations shown according to FIG. 2 and FIG. 6A.
Figure 6C:
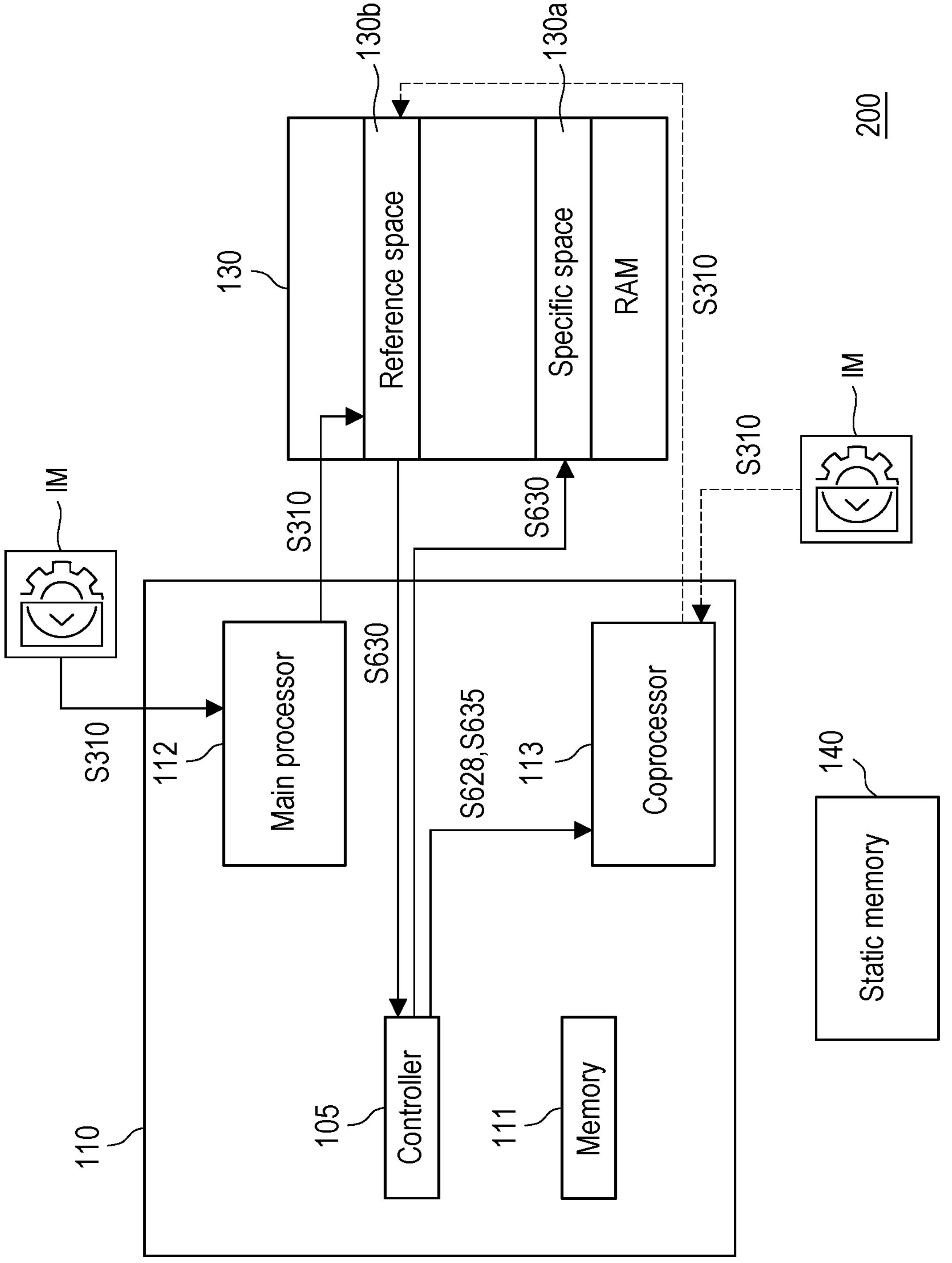

Please refer to FIG. 6A to FIG. 6C, wherein FIG. 6A is a flowchart of resetting a coprocessor shown in a third scenario according to the first embodiment of the invention, and FIG. 6B and FIG. 6C are schematic diagrams of operations shown according to FIG. 2 and FIG. 6A.

In a third scenario of the first embodiment, the first component considered is, for example, the main processor 112, and the second component is, for example, the controller 105, wherein the main processor 112 may obtain the image file IM in step S310, and load the image file IM into the reference space 130*b*. Moreover, in a variant of the third scenario of the first embodiment, the first component considered may also be the coprocessor 113, and may obtain the image file IM in step S310, and load the image file IM into the reference space 130*b* (i.e., step S310 corresponding to the dotted line in FIG. 6B and FIG. 6C).

First, in step S610, in response to determining that the coprocessor 113 needs to be reset, the controller 105 determines whether the main processor 112 needs to be reset together. In a different embodiment, the coprocessor 113 may need to be reset for one of the following reasons: (1) update the executable image of the coprocessor 113; (2) restart of the coprocessor 113; (3) system restart (the coprocessor 113 is restarted together with the main processor 112), but may be not limited thereto.

Therefore, when the above three reasons occur, the controller 105 (i.e., the second component) may perform the determination of step S610.

In the scenario of FIG. 6B (which corresponds to steps S611 to S619), when the controller 105 determines in step S610 that the main processor 112 needs to be reset together, the controller 105 may continue to perform step S611 to hold a plurality of reset signals corresponding to the main processor 112 and the coprocessor 113.

Then, in step S612, the controller 105 determines whether the image file IM (for example, the latest updated image file obtained by the first component) is loaded/updated into the static memory 140. If not, the controller 105 may continue to perform step S613, otherwise, it may continue to perform step S621.

In step S613, the controller 105 disables the write-protect function of the specific space 103*a*; in step S614, the controller 105 loads the image file IM from the reference space 103*b* into the specific space 103*a*; in step S615, the controller 105 enables the write-protect function of the specific space; in step S616, the controller 105 validates the image file IM stored in the specific space 130*a*.

In step S617, the controller 105 determines whether the image file IM stored in the specific space 130*a* is valid. If yes, the controller 105 performs step S618 to load/update the image file IM stored in the specific space 130*a* into the static memory 140, and releases the reset signals corresponding to the main processor 112 and the coprocessor 113 in step S619, and the coprocessor 113 may correspondingly perform step S640 to perform a reset operation based on the executable image file IM stored in the specific space 130*a* in response to the corresponding reset signal. If not, the controller 105 performs step S620 to hold the reset signal corresponding to the coprocessor 113 (which may be understood as stopping the image update operation of the coprocessor 113).

In step S621, the controller 105 disables the write-protect function of the specific space; in step S622, the controller 105 loads the image file IM from the static memory 140 into the specific space 130*a*; in step S623, the controller 105 enables the write-protect function of the specific space 130*a*; in step S624, the controller 105 validates the image file IM stored in the specific space 130*a*.

In step S625, the controller 105 determines whether the image file IM stored in the specific space 130*a* is valid. If yes, the controller 105 performs step S627 to release the reset signals corresponding to the main processor 112 and the coprocessor 113, and the coprocessor 113 may correspondingly perform step S640 to perform a reset operation based on the image file IM stored in the specific space 130*a* in response to the corresponding reset signal. If not, the controller 105 performs step S626 to hold the reset signal corresponding to the coprocessor 113 (which may be understood as stopping the reset operation of the coprocessor 113).

In an embodiment, when the controller 105 determines in step S610 that the main processor 112 does not need to be reset together, the controller 105 may continue to perform step S628 based on the situation of FIG. 6C (which corresponds to steps S628 to S635) to hold the reset signal corresponding to the coprocessor 113.

Next, in step S629, the controller 105 disables the write-protect function of the specific space; in step S630, the controller 105 loads the image file IM from the reference space 130*b* into the specific space 130*a*.

In some embodiments, before any of steps S629 to S631 is performed, the controller 105 may also first determine whether the image file IM stored in the specific space 130*a* is reorganized (for example, whether the content thereof is adjusted/edited). If yes, the controller 105 may continue to perform steps S629 to S631; if not, the controller 105 may directly perform subsequent operations without performing steps S629 to S631, but may be not limited thereto.

In step S631, the controller 105 enables the write-protect function of the specific space 130*a*; in step S632, the controller 105 validates the image file IM stored in the specific space 130*a*.

In step S633, the controller 105 determines whether the image file IM stored in the specific space 130*a* is valid. If yes, the controller 105 performs step S635 to release the reset signal corresponding to the coprocessor 113, and the coprocessor 113 may correspondingly perform step S640 to perform a reset operation based on the image file IM stored in the specific space 130*a* in response to the corresponding reset signal. If not, the controller 105 performs step S634 to hold the reset signal corresponding to the coprocessor 113 (which may be understood as stopping the reset operation of the coprocessor 113).

Figure 7A:
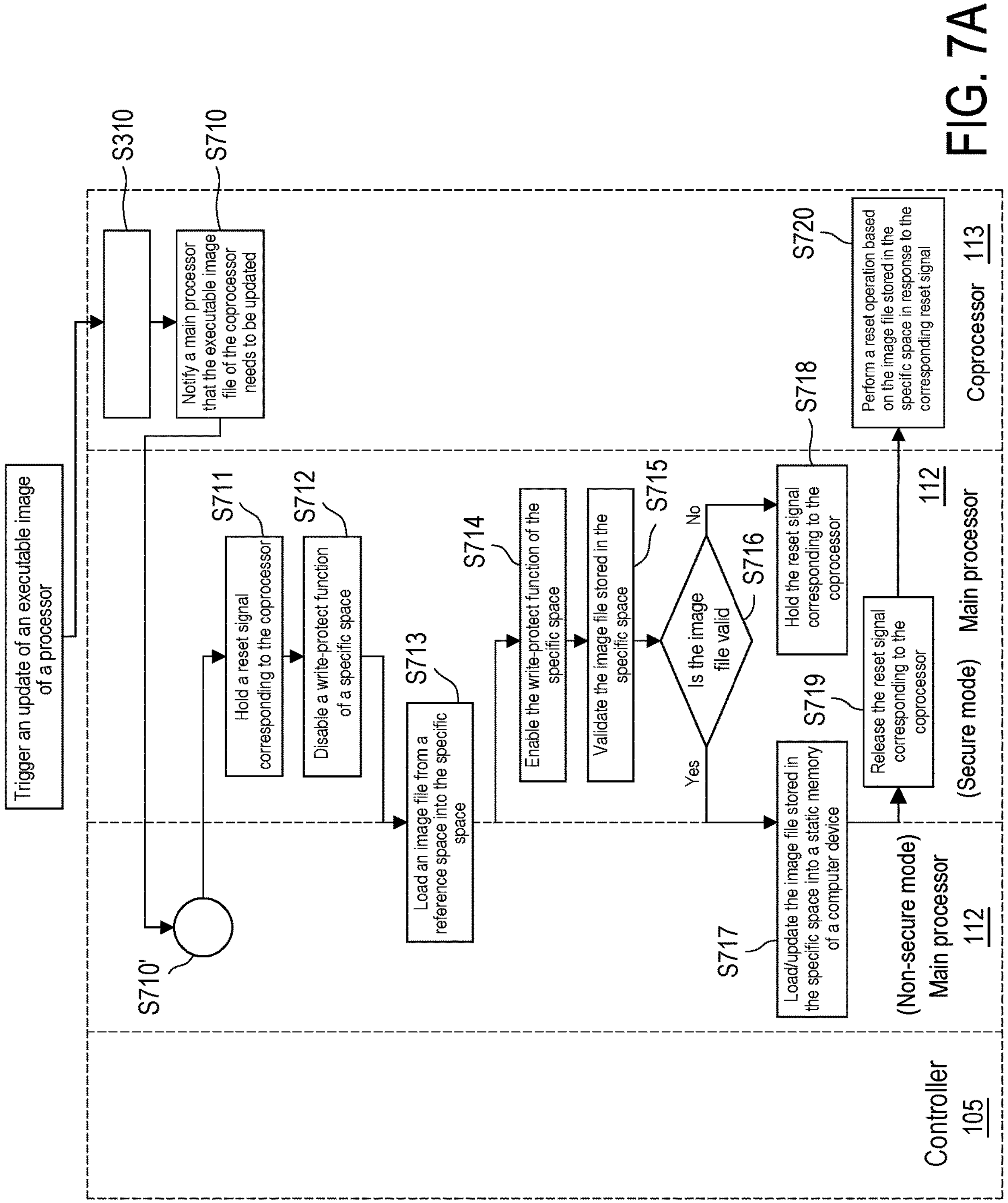
FIG. 7A is a flowchart of resetting a coprocessor shown according to a fourth scenario of the first embodiment of the invention.
Figure 7B:
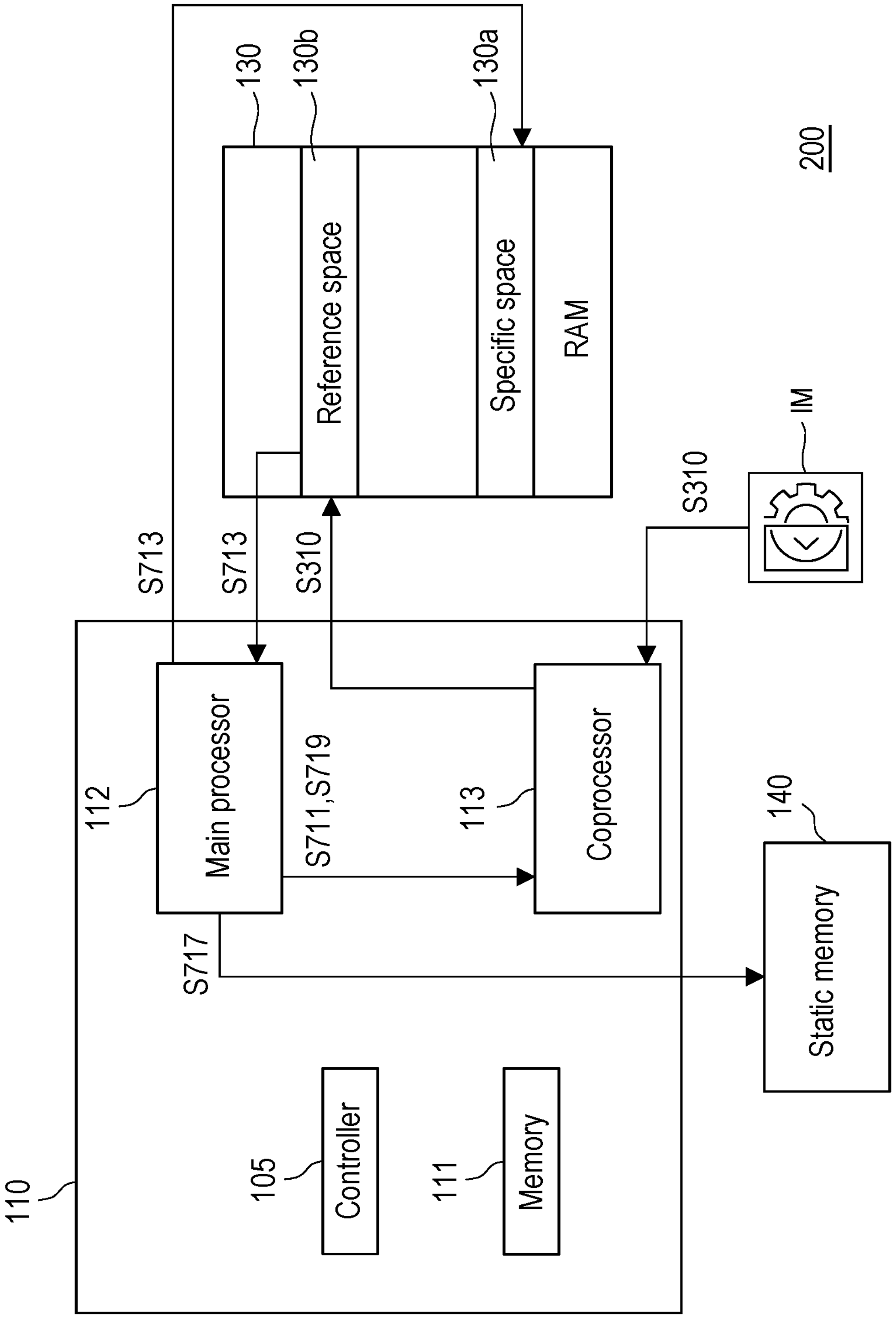
FIG. 7B is a schematic diagram of an operation shown according to FIG. 2.

Please refer to FIG. 7A and FIG. 7B, wherein FIG. 7A is a flowchart of resetting a coprocessor shown in a fourth scenario according to the first embodiment of the invention, and FIG. 7B is a schematic diagram of operations shown according to FIG. 2 and FIG. 7A.

In FIG. 7A, for example, a scenario in which an (image file) update of the coprocessor 113 is triggered is considered. Furthermore, in the fourth scenario of the first embodiment, the considered first component and second component are, for example, the coprocessor 113 and the main processor 112 respectively. In FIG. 7A, the coprocessor 113 may obtain the image file IM in step S310, and load the image file IM into the reference space 130*b*. Next, the coprocessor 113 may notify the main processor 112 that the executable image file of the coprocessor 113 needs to be updated in step S710.

Next, the main processor 112 (i.e., the second component) may execute step S711 and subsequent steps in the security mode. It should be understood that, in an embodiment in which the main processor 112 is assumed to operate under the ARM architecture, the main processor 112 needs to switch from the non-secure mode to the secure mode via step S710' before proceeding to step S711. However, in an embodiment where the main processor 112 operates on other processor architectures, step S710' may not need to be performed, but may be not limited thereto.

In step S711, the main processor 112 holds the reset signal corresponding to the coprocessor 113; in step S712, the main processor 112 disables the write-protect function of the specific space 130*a*; in step S713, the main processor 112 loads the image file IM from the reference space 130*b* into the specific space 130*a*; in step S714, the main processor 112 enables the write-protect function of the specific space 130*a*; in step S715, the main processor 112 validates the image file IM stored in the specific space 130*a*.

In step S716, the main processor 112 determines whether the image file IM stored in the specific space 130*a* is valid. If yes, the main processor 112 performs step S717 to load/update the image file IM stored in the specific space 130*a* into the static memory 140 of the computer device 200, and performs step S719 to release the reset signal corresponding to the coprocessor 113, and the coprocessor 113 may correspondingly perform step S720 to perform a reset operation based on the image file IM stored in the specific space 130*a* in response to the corresponding reset signal. If not, the main processor 112 performs step S718 to hold the reset signal corresponding to the coprocessor 113 (which may be understood as stopping the update of the coprocessor 113).

Figure 8A:
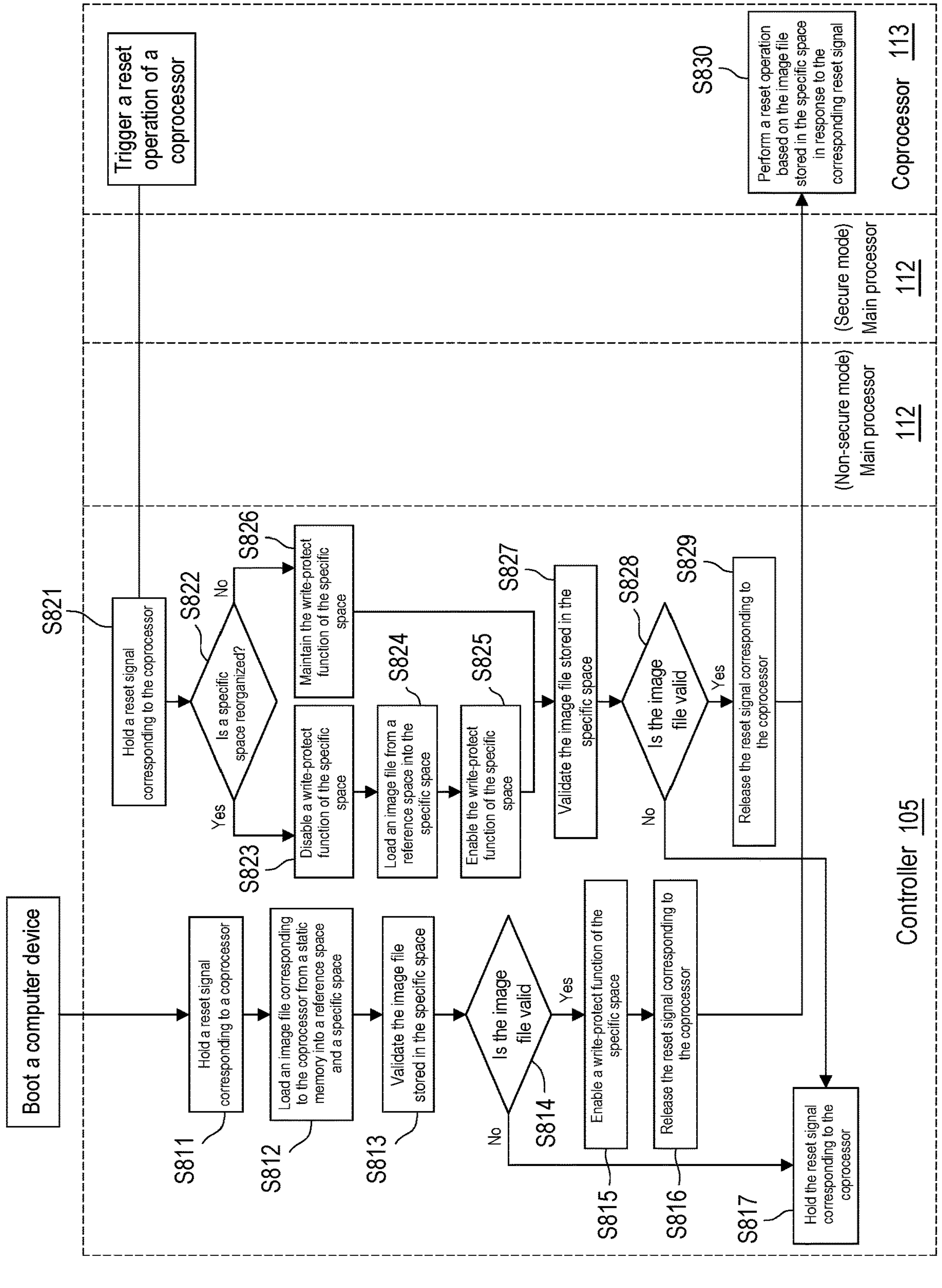
FIG. 8A is a flowchart of resetting a coprocessor shown according to a first scenario of the second embodiment of the invention.
Figure 8B:
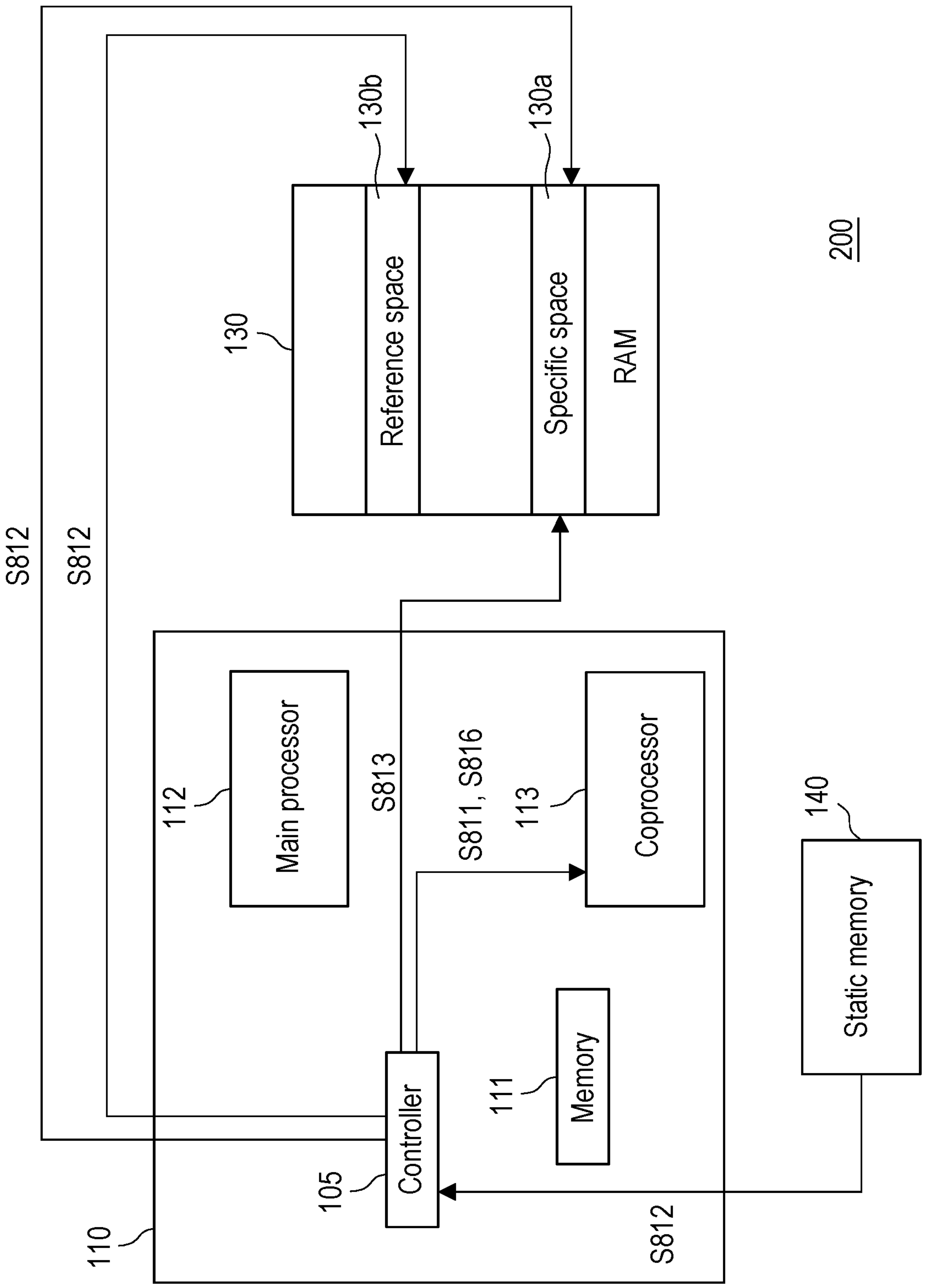
FIG. 8B and FIG. 8C are schematic diagrams of operations shown according to FIG. 2 and FIG. 8A.
Figure 8C:
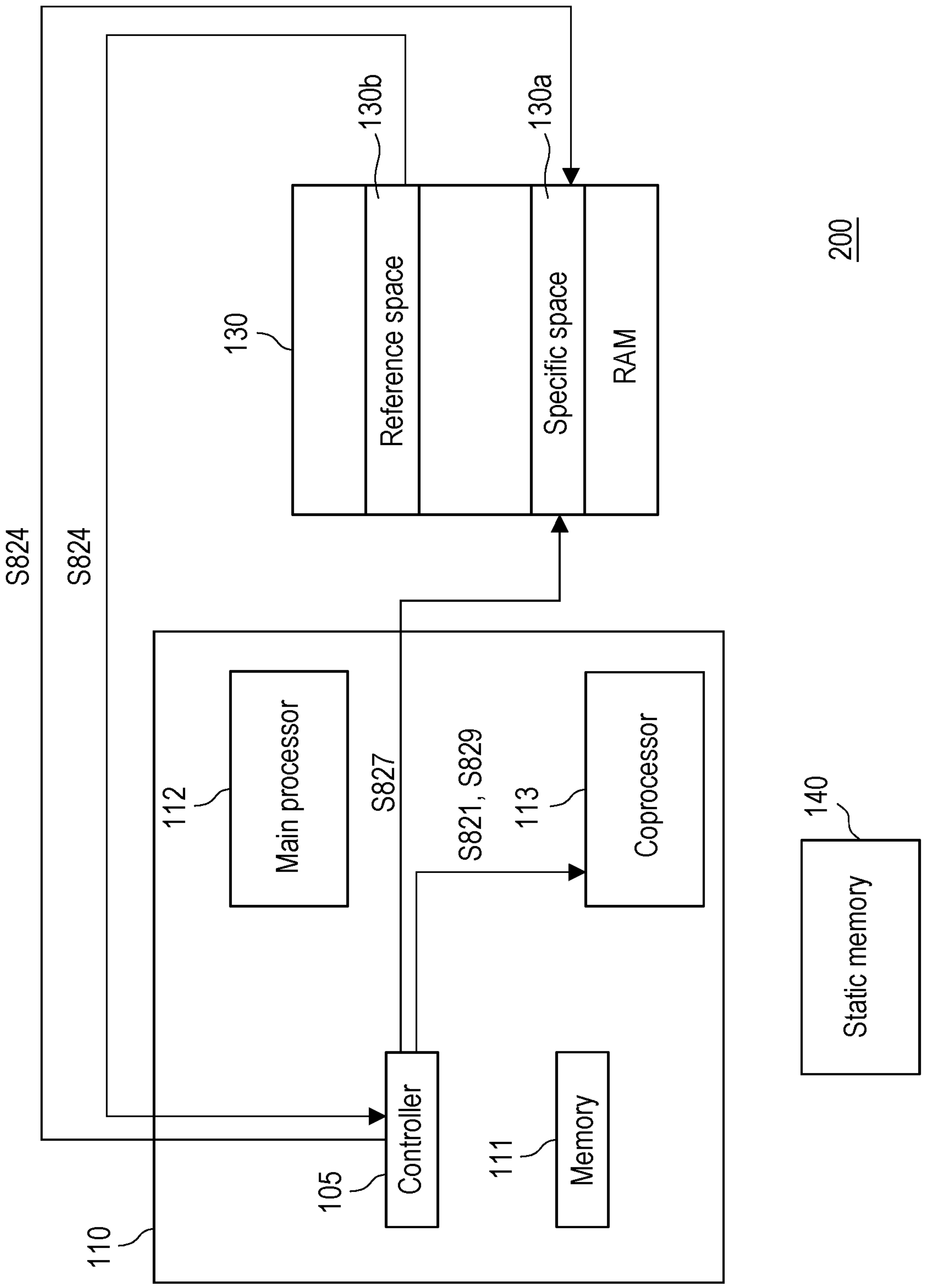

Please refer to FIG. 8A to FIG. 8C, wherein FIG. 8A is a flowchart of resetting a coprocessor shown in a first scenario according to the second embodiment of the invention, and FIG. 8B and FIG. 8C are schematic diagrams of operations shown according to FIG. 2 and FIG. 8A.

In FIG. 8A to FIG. 8C, the controller 105 may be used as the first component and the second component together, but may be not limited thereto. The content of FIG. 8B shows an embodiment in which the computer device 200 is turned on, and FIG. 8B corresponds to steps S811 to S817 in FIG. 8A. In FIG. 8A and FIG. 8B, the controller 105 may hold a reset signal corresponding to the coprocessor 113 in step S811. Next, in step S812, the controller 105 loads the image file IM from the static memory 140 of the computer device 200 into the reference space 130*b* and the specific space 130*a*. In an embodiment, step S812 may be understood as a way for the controller 105 to perform step S310 as the first component, but may be not limited thereto. Next, in step S813, the controller 105 validates the image file IM stored in the specific space 130*a*.

In step S814, the controller 105 determines whether the image file IM stored in the specific space 130*a* is valid. If yes, the controller 105 performs step S815 to enable the write-protect function of the specific space 130*a* and performs step S816 to release the reset signal corresponding to the coprocessor 113, and the coprocessor 113 may correspondingly perform step S830 to perform a reset operation based on the image file IM stored in the specific space 130*a* in response to the corresponding reset signal. If not, the controller 105 performs step S817 to hold the reset signal corresponding to the coprocessor 113 (which may be understood as stopping the reboot operation of the coprocessor 113).

The content of FIG. 8C shows an embodiment in which the reset operation of the coprocessor 113 is triggered, and FIG. 8C corresponds to steps S821 to S829 in FIG. 8A. In FIG. 8A and FIG. 8C, the controller 105 may hold a reset signal corresponding to the coprocessor 113 in step S821. Then, in step S822, the controller 105 determines whether the specific space 130*a* is reorganized (for example, whether the content of the specific space 130*a* is changed/edited). If yes, the controller 105 may continue to perform steps S823 to S825; if not, the controller 105 may continue to perform step S826 to maintain the write-protect function of the specific space 130*a*.

In step S823, the controller 105 disables the write-protect function of the specific space 130*a*; in step S824, the controller 105 loads the image file IM from the reference space 130*b* into the specific space 130*a*; in step S825, the controller 105 enables the write-protect function of the specific space 130*a*.

After step S825 and step S826, the controller 105 may continue to perform step S827 to validate the image file IM stored in the specific space 130*a*.

In step S828, the controller 105 determines whether the image file IM stored in the specific space 130*a* is valid. If yes, the controller 105 performs step S829 to release the reset signal corresponding to the coprocessor 113, and the coprocessor 113 may correspondingly perform step S830 to perform a reset operation based on the image file IM stored in the specific space 130*a* in response to the corresponding reset signal. If not, the controller 105 performs step S817 to hold the reset signal corresponding to the coprocessor 113 (which may be understood as stopping the reset operation of the coprocessor 113).

In the second embodiment, since the security permission of the main processor 112 is lower than the security permission of the coprocessor 113, the main processor 112 may not operate according to the mechanism taught in FIG. 7A and FIG. 7B to handle the reset/update of the coprocessor 113. In this case, only the controller 105 with higher security permission may be used to handle the reset/update of the coprocessor 113.

Furthermore, in the first embodiment, since the security permissions of the main processor 112 and the controller 105 are both higher than the security permission of the coprocessor 113, both the main processor 112 and the controller 105 may be used to handle the reset signal corresponding to the coprocessor 113. However, in the second embodiment, since the security permission of the main processor 112 is lower than the security permission of the coprocessor 113, only the controller 105 with higher security permission may be used to handle the reset signal corresponding to the coprocessor 113.

Accordingly, in the second embodiment, the controller 105 may still operate according to the mechanism taught in FIG. 6A to FIG. 6C to handle the reset/update of the coprocessor 113, and the related description thereof is as provided in the relevant content of the previous embodiments, and is not repeated here.

Based on the above, the method proposed by an embodiment of the invention may use the reference space in the random-access memory as another type of static memory, and when the coprocessor needs to reset/update based on the file (such as image file) stored in the specific space, the file stored in the reference space may be loaded into the specific space for the coprocessor reset/update operation. In this way, no matter whether the static memory is occupied (for example, being accessed by the main processor), the coprocessor may complete the update/reset independently. In this case, it is possible to avoid a situation where a certain processor cannot be reset smoothly and causing the entire system to freeze.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method for resetting a processor, suitable for a computer device comprising a controller, a main processor, a coprocessor, a static memory, and a random-access memory, the method comprising:

obtaining a complete image file corresponding to the coprocessor by a first component of the computer device, and loading the complete image file into a reference space in the random-access memory by the first component, wherein the random-access memory comprises a specific space corresponding to the coprocessor, and the first component is the coprocessor, wherein the reference space is a first designated random-access memory region configured to store said complete image file, and the specific space is a second designated random-access memory region, distinct from the reference space, configured to store the complete image file and from which the coprocessor executes;

notifying, by the coprocessor, the main processor that an executable image file of the coprocessor needs to be updated;

loading the complete image file stored in the reference space into the specific space corresponding to the coprocessor by a second component of the computer device, thereby enabling a reset of the coprocessor independently of an access status of the static memory of the computer device, and validating the complete image file stored in the specific space by the second component in response to determining that the coprocessor needs to be reset, wherein the second component is the main processor; and resetting the coprocessor based on the complete image file stored in the specific space by the second component in response to the second component determining that the complete image file stored in the specific space is valid, wherein the first component is the coprocessor, the second component is the main processor, a security permission of the main processor is higher than a security permission of the coprocessor, and before the step of validating the complete image file stored in the specific space by the second component, the method further comprises:

switching the main processor from a non-secure mode to a secure mode;

holding a reset signal corresponding to the coprocessor by the main processor in response to determining that the coprocessor needs to be reset; and disabling a write-protect function of the specific space, loading the complete image file from the reference space into the specific space, and enabling the write-protect function of the specific space by the main processor;

wherein the step of resetting the coprocessor based on the complete image file stored in the specific space by the second component in response to the second component determining that the complete image file stored in the specific space is valid comprises:

loading/updating the complete image file stored in the specific space into the static memory of the computer device and releasing the reset signal corresponding to the coprocessor by the main processor, wherein the coprocessor performs a reset operation based on the complete image file stored in the specific space in response to the corresponding reset signal.

2. The method of claim 1, wherein the holding of the reset signal corresponding to the coprocessor by the main processor is performed in response to determining that the coprocessor needs to be reset but the main processor does not need to be reset together.

3. The method of claim 1, further comprising:

determining the coprocessor needs to be reset in response to determining that the computer device is booted or a reset operation of the coprocessor is triggered.

4. A computer device, comprising:

a controller;

a main processor;

a coprocessor;

a static memory; and a random-access memory, wherein a first component of the computer device obtains a complete image file corresponding to the coprocessor, and the first component loads the complete image file into a reference space in the random-access memory, wherein the random-access memory comprises a specific space corresponding to the coprocessor, and the first component is the coprocessor, wherein the reference space is a first designated random-access memory region configured to store said complete image file, and the specific space is a second designated random-access memory region, distinct from the reference space, configured to store the complete image file and from which the coprocessor executes;

wherein the coprocessor notifies the main processor that an executable image file of the coprocessor needs to be updated;

a second component of the computer device loads the complete image file stored in the reference space into the specific space corresponding to the coprocessor, thereby enabling a reset of the coprocessor independently of an access status of the static memory of the computer device, and the second component validates the complete image file stored in the specific space in response to determining that the coprocessor needs to be reset, wherein the second component is the main processor; and the second component resets the coprocessor based on the complete image file stored in the specific space in response to the second component determining that the complete image file stored in the specific space is valid, wherein the first component is the coprocessor, the second component is the main processor, a security permission of the main processor is higher than a security permission of the coprocessor, and before the second component validates the complete image file stored in the specific space, the main processor further performs:

switching the main processor from a non-secure mode to a secure mode;

holding a reset signal corresponding to the coprocessor in response to determining that the coprocessor needs to be reset;

disabling a write-protect function of the specific space, loading the complete image file from the reference space into the specific space, and enabling the write-protect function of the specific space;

wherein in response to the second component determining that the complete image file stored in the specific space is valid, the main processor performs:

loading/updating the complete image file stored in the specific space into the static memory of the computer device and releasing the reset signal corresponding to the coprocessor, wherein the coprocessor performs a reset operation based on the complete image file stored in the specific space in response to the corresponding reset signal.

5. The computer device of claim 4, wherein the holding of the reset signal corresponding to the coprocessor by the main processor is performed in response to determining that the coprocessor needs to be reset but the main processor does not need to be reset together.

6. The computer device of claim 4, wherein in response to determining that the computer device is booted or a reset operation of the coprocessor is triggered, the coprocessor is determined as needing to be reset.

* * * * *